US011687561B2

(12) United States Patent
Helvey et al.

(10) Patent No.: US 11,687,561 B2
(45) Date of Patent: Jun. 27, 2023

(54) SYSTEMS AND METHODS FOR CROSS-REGION DATA PROCESSING

(71) Applicant: Capital One Services, LLC, McLean, VA (US)

(72) Inventors: Eric Helvey, Alexandria, VA (US); Emmanuel Marcellino, McLean, VA (US); Daniel Willert, Arlington, VA (US); Maruti Pradeep Pakalapati, Falls Church, VA (US); Stephanie McCormack, Arlington, VA (US); Mohit Kashyap, Herndon, VA (US); John Kiefer, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/399,082

(22) Filed: Aug. 11, 2021

(65) Prior Publication Data

US 2023/0051639 A1 Feb. 16, 2023

(51) Int. Cl.
*G06F 16/27* (2019.01)
*G06Q 30/04* (2012.01)

(52) U.S. Cl.
CPC ............. *G06F 16/27* (2019.01); *G06Q 30/04* (2013.01)

(58) Field of Classification Search
None
See application file for complete search history.

(56) References Cited

U.S. PATENT DOCUMENTS

| | | | |
|---|---|---|---|
| 9,460,126 B1* | 10/2016 | Engers | G06F 16/21 |
| 10,929,428 B1* | 2/2021 | Brahmadesam | G06F 16/2379 |
| 2009/0187600 A1* | 7/2009 | Winbom | G06F 11/1464 |
| 2012/0166390 A1* | 6/2012 | Merriman | G06F 16/2365 |
| | | | 707/613 |
| 2014/0324785 A1* | 10/2014 | Gupta | G06F 16/2358 |
| | | | 707/689 |
| 2017/0032007 A1* | 2/2017 | Merriman | G06F 16/25 |
| 2017/0054802 A1* | 2/2017 | Annamalai | G06F 16/248 |
| 2019/0138639 A1* | 5/2019 | Pal | G06F 16/27 |
| 2020/0364760 A1* | 11/2020 | Sabat | G06Q 30/04 |
| 2021/0240660 A1* | 8/2021 | Khandkar | G06F 11/2038 |
| 2021/0382912 A1* | 12/2021 | Horowitz | H04L 63/166 |

* cited by examiner

*Primary Examiner* — Alford W Kindred
*Assistant Examiner* — Cao D Vuong
(74) *Attorney, Agent, or Firm* — Troutman Pepper Hamilton Sanders LLP; Christopher J. Forstner; John A. Morrissett

(57) ABSTRACT

A system may include processor(s) and a memory in communication with the processor(s) and storing instructions, that when executed by the processor(s), are configured to cause the system to perform a method for cross-region data processing. The system may receive data in a first processing region and may format the data into a plurality of data portions. The system may generate a copy of each data portion and may transmit each data portion copy to a cross-region processor. Responsive to determining the first processing region is functioning, the system may process data portion(s). The system may transmit, to a centralized location, the processed data portion(s). Responsive to determining the first processing region is not functioning, the system may transmit, from the cross-region processor, each data portion copy to a second processing region.

17 Claims, 6 Drawing Sheets

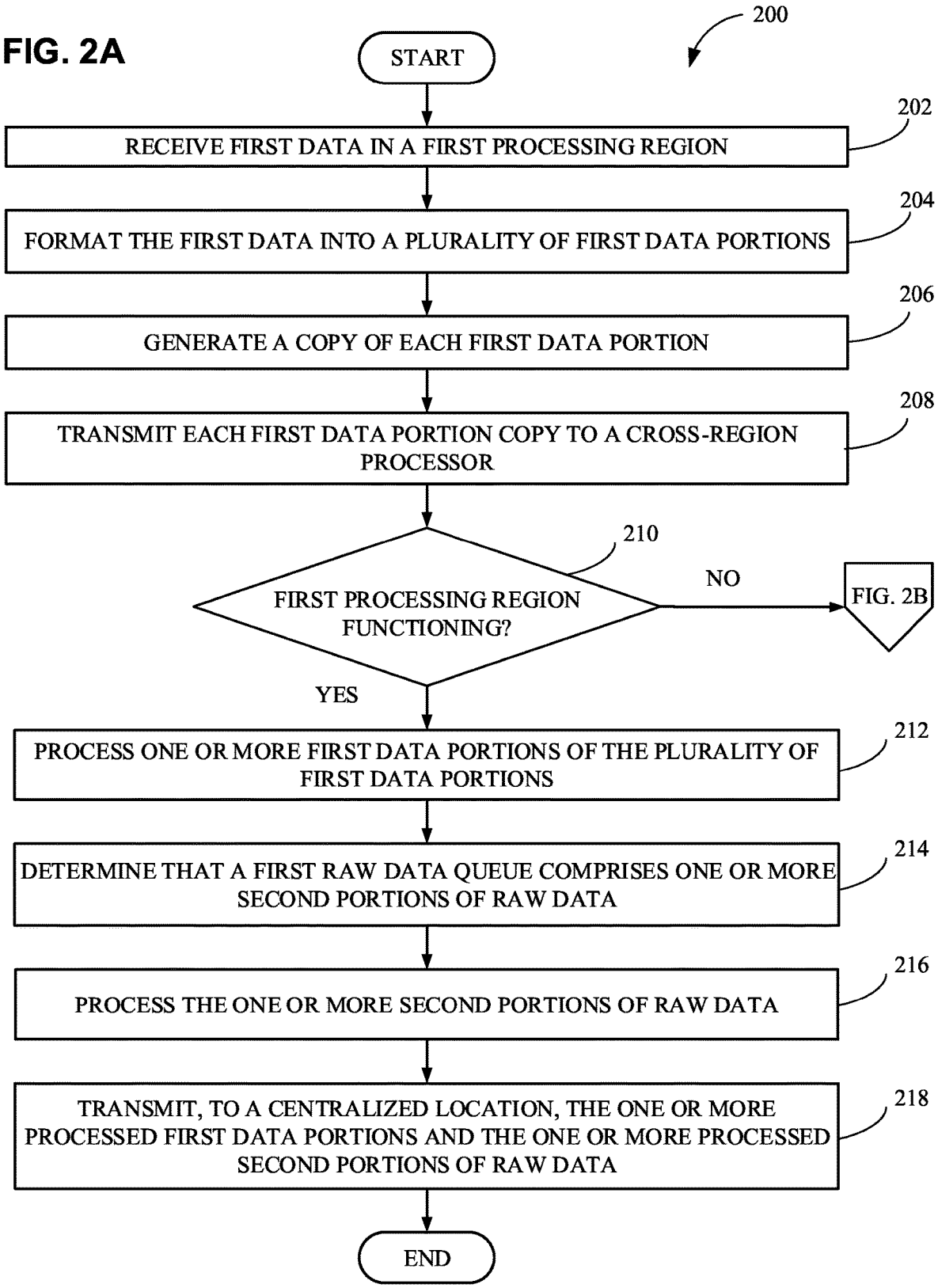

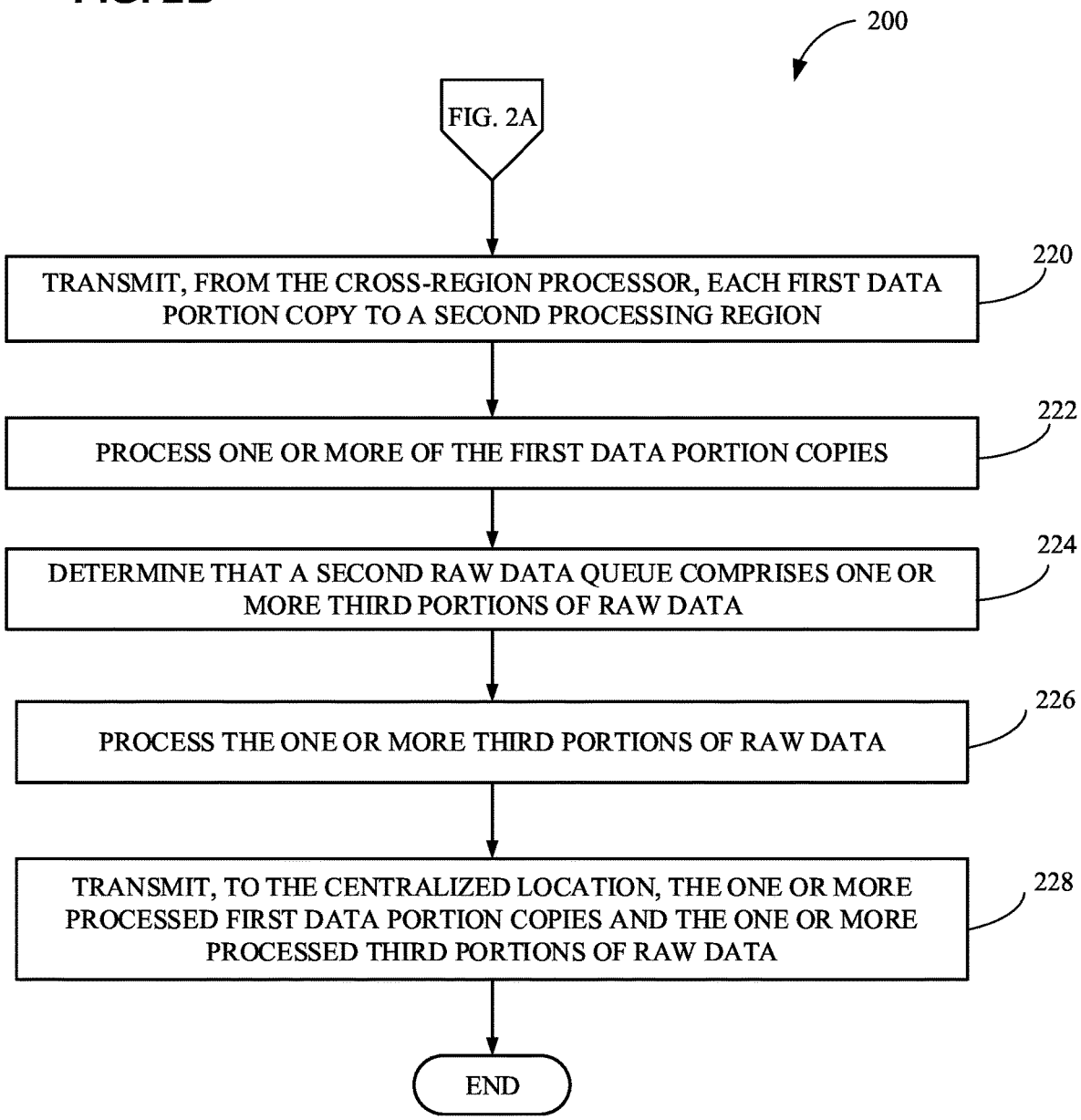

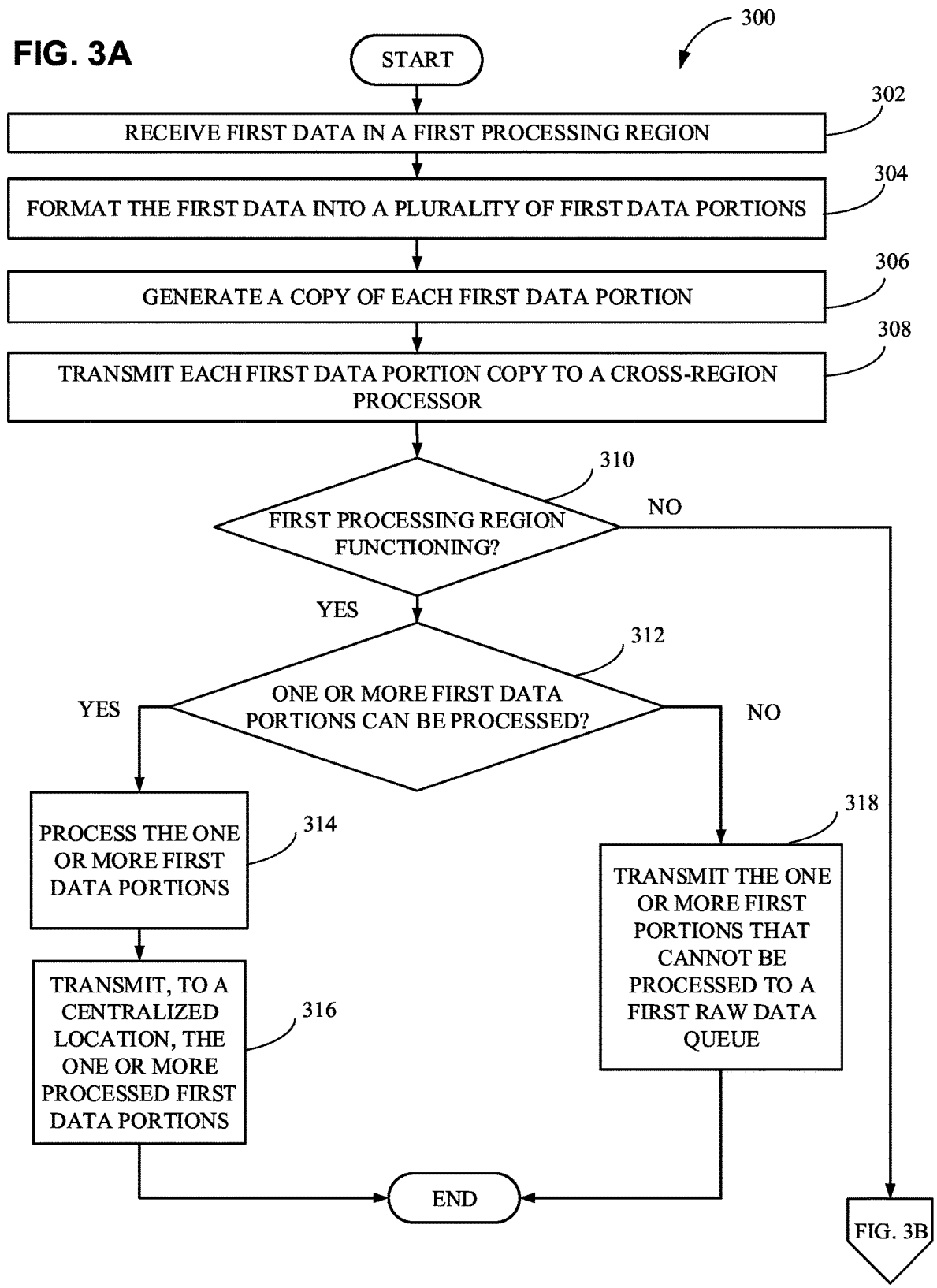

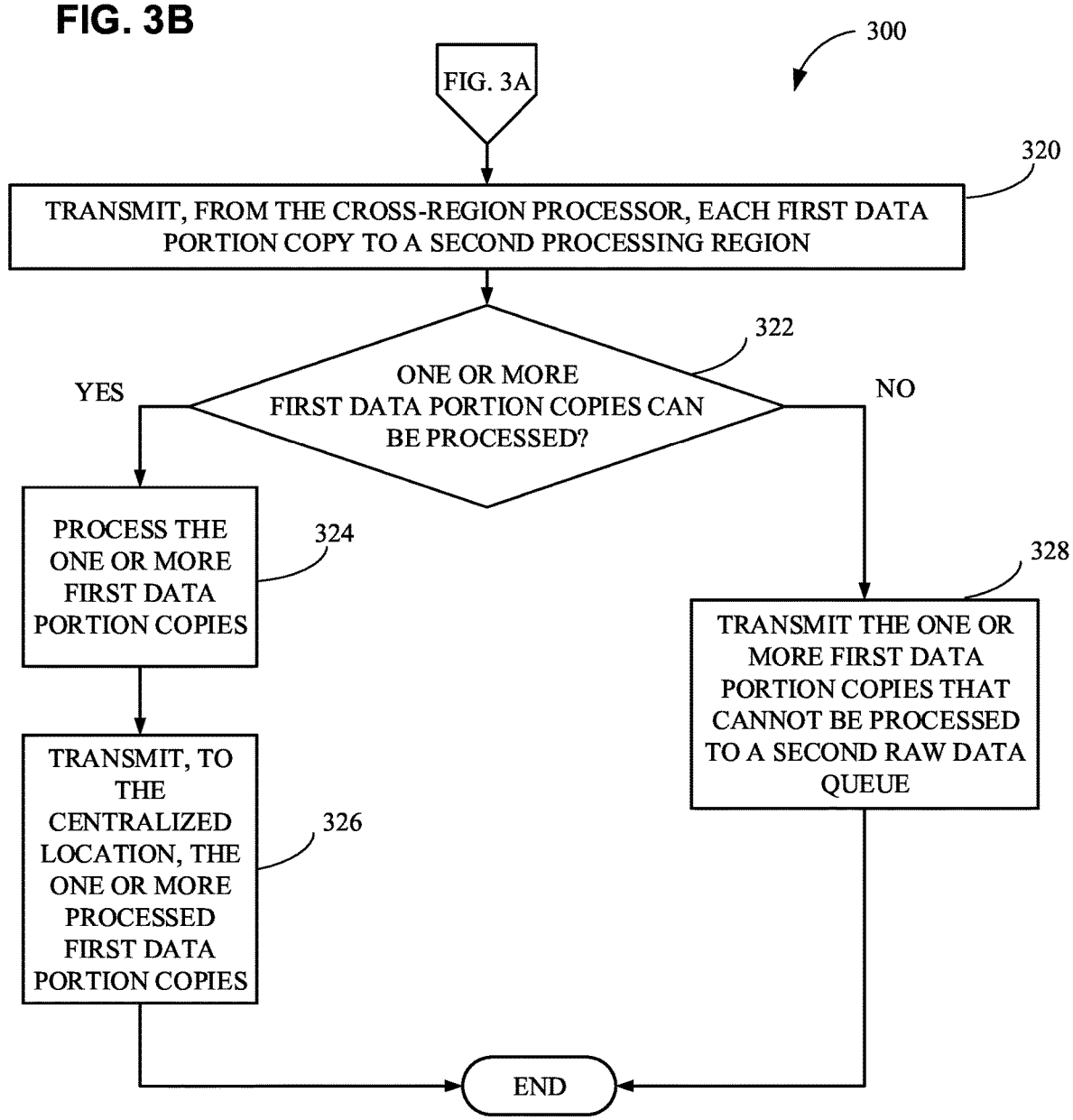

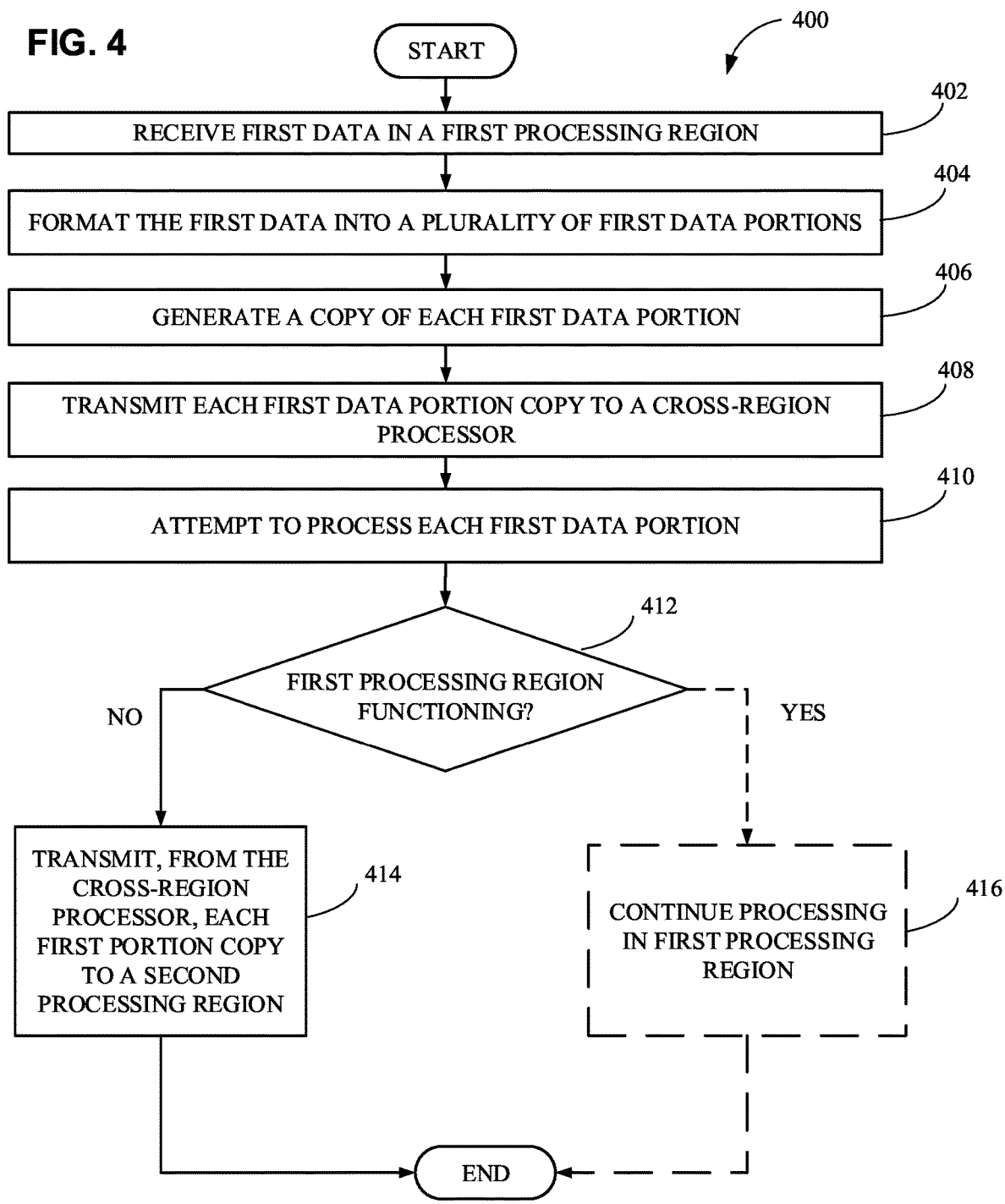

SYSTEMS AND METHODS FOR CROSS-REGION DATA PROCESSING

FIELD

The disclosed technology relates to systems and methods for cross-region data processing, and more particularly for guaranteed processing of batched input files regardless of any time or region limitations.

BACKGROUND

With cloud-based platforms becoming more prevalent, organizations oftentimes outsource data processing functions to third-party services to ensure internal organization systems do not become bogged down. For example, Amazon Web Services (AWS) Lambda functions offer a low-cost option for outsourcing of cloud computing. The benefits of mechanisms like AWS Lambda functions are that they eliminate the need for organizations to maintain their own data processing infrastructure and allow organizations to pay only when their applications are running, as opposed to during system idle time. These types of serverless systems, however, typically involve processing time and region limitations to ensure fair access to resources.

With respect to time limitations, these cloud computing functions only exist for or timeout after a certain period of time. For example, AWS Lambda functions can only exist on a piece of hardware for a fifteen-minute period, known as a Lambda function's "execution context." This means that after fifteen minutes, each execution context is destroyed, erasing all transient memory. Similarly, Microsoft Azure functions time out after ten minutes. If information required for running a given execution context was not previously saved outside of the execution context itself, that information will be permanently lost. This limitation can be particularly risky for larger and/or more complex organizations that optimize around automated file batch processing using a "fire and forget" model. That is, once a file batch is sent by a requestor for processing via a Lambda function, the requestor does not follow up on the processing of that batch, but instead relies solely on the receiver to guarantee the files are processed completely. In the event the Lambda function execution context times out, any information contained within an only partially processed data file will be lost.

With respect to region limitations, some cloud computing functions such as AWS Lambda functions operate as region-specific. That is, in the event of a temporary service failure within a given processing region, any information contained in only partially processed data files will again be lost.

Accordingly, there is a need for improved systems and methods that provide for accommodations for temporary failures of dependent computing services thereby guaranteeing automated processing of batched input files. Embodiments of the present disclosure are directed to this and other considerations.

SUMMARY

Disclosed embodiments provide systems and methods for cross-region data processing.

Consistent with the disclosed embodiments, a system may include one or more processors and a memory in communication with the one or more processors and storing instructions, that when executed by the one or more processors, are configured to cause the system to perform a method for cross-region data processing. The system may receive first data in a first processing region. The system may format (i.e., chunk) the first data into a plurality of first data portions. The system may generate a copy of each first data portion of the plurality of first data portions. The system may transmit each first data portion copy to a cross-region processor. The system may determine whether the first processing region is functioning. Responsive to determining the first processing region is functioning, the system may process one or more first data portions of the plurality of first data portions. The system may also determine that a first raw data queue comprises one or more second portions of raw data. The system may determine whether the first raw data queue comprises one or more second portions of raw data. The system may process the one or more second portions of raw data. The system may then transmit, to a centralized location, the one or more processed first data portions and the one or more processed second portions of raw data. Responsive to determining the first processing region is not functioning, the system may transmit, from the cross-region processor, each first data portion copy to a second processing region. The system may then process one or more of the first data portion copies. The system may also determine that a second raw data queue comprises one or more third portions of raw data. The system may process the one or more third portions of raw data. The system may transmit, to the centralized location, the one or more processed first data portion copies and the one or more processed third portions of raw data. This embodiment provides the benefit of being able to switch data processing regions if one region is found to be non-functioning. Further, this embodiment provides the benefit of checking to see if any raw, or unprocessed, portions of data remain in a raw data queue such that the system can attempt to reprocess those portions of data.

In another embodiment, a system may include one or more processors and a memory in communication with the one or more processors and storing instructions, that when executed by the one or more processors, are configured to cause the system to perform a method for cross-region data processing. The system may receive first data in a first processing region. The system may format the first data into a plurality of first data portions. The system may generate a copy of each first data portion of the plurality of first data portions. The system may transmit each first data portion copy to a cross-region processor. The system may determine whether the first processing region is functioning. Responsive to determining the first processing region is functioning, the system may determine whether one or more first data portions of the plurality of first data portions can be processed. Responsive to determining the one or more first data portions can be processed, the system may process the one or more first data portions of the plurality of first data portions. The system may then transmit, to a centralized location, the one or more processed first data portions. Responsive to determining the one or more first data portions of the plurality of first data portions cannot be processed, the system may transmit the one or more first data portions that cannot be processed to a first raw data queue. Responsive to determining the first processing region is not functioning, the system may transmit, from the cross-region processor, each first data portion copy to a second processing region. The system may determine whether one or more first data portion copies can be processed. Responsive to determining the one or more first data portion copies can be processed, the system may process the one or more first data portions copies. The system may then transmit, to the centralized location, the one or more processed first data portion copies. Responsive to determining the one or more first data portion copies cannot be processed, the system may transmit the one or more first data portion copies that cannot be processed to a second raw data queue. This embodiment provides the benefit of placing any portions of data that cannot be processed in a raw data queue for later processing such that the information contained in those data portions will not be permanently lost.

In another embodiment, a system may include one or more processors and a memory in communication with the one or more processors and storing instructions, that when executed by the one or more processors, are configured to cause the system to perform a method for cross-region data processing. The system may receive first data in a first processing region. The system may format the first data into a plurality of first data portions. The system may generate a copy of each first data portion of the plurality of first data portions. The system may transmit each first data portion copy to a cross-region processor. The system may attempt to process each first data portion of the plurality of first data portions. The system may determine the first processing region is not functioning. Responsive to determining the first processing region is not functioning, the system may transmit, from the cross-region processor, each first data portion copy to a second processing region.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 2A-2B are a flowchart of a method for cross-region data processing, in accordance with some embodiments of the present disclosure;

FIGS. 3A-3B are a flowchart of a method for cross-region data processing, in accordance with some embodiments of the present disclosure; and FIG. 4 is a flowchart of a method for cross-region data processing, in accordance with some embodiments of the present disclosure.

DETAILED DESCRIPTION

Figure 1:
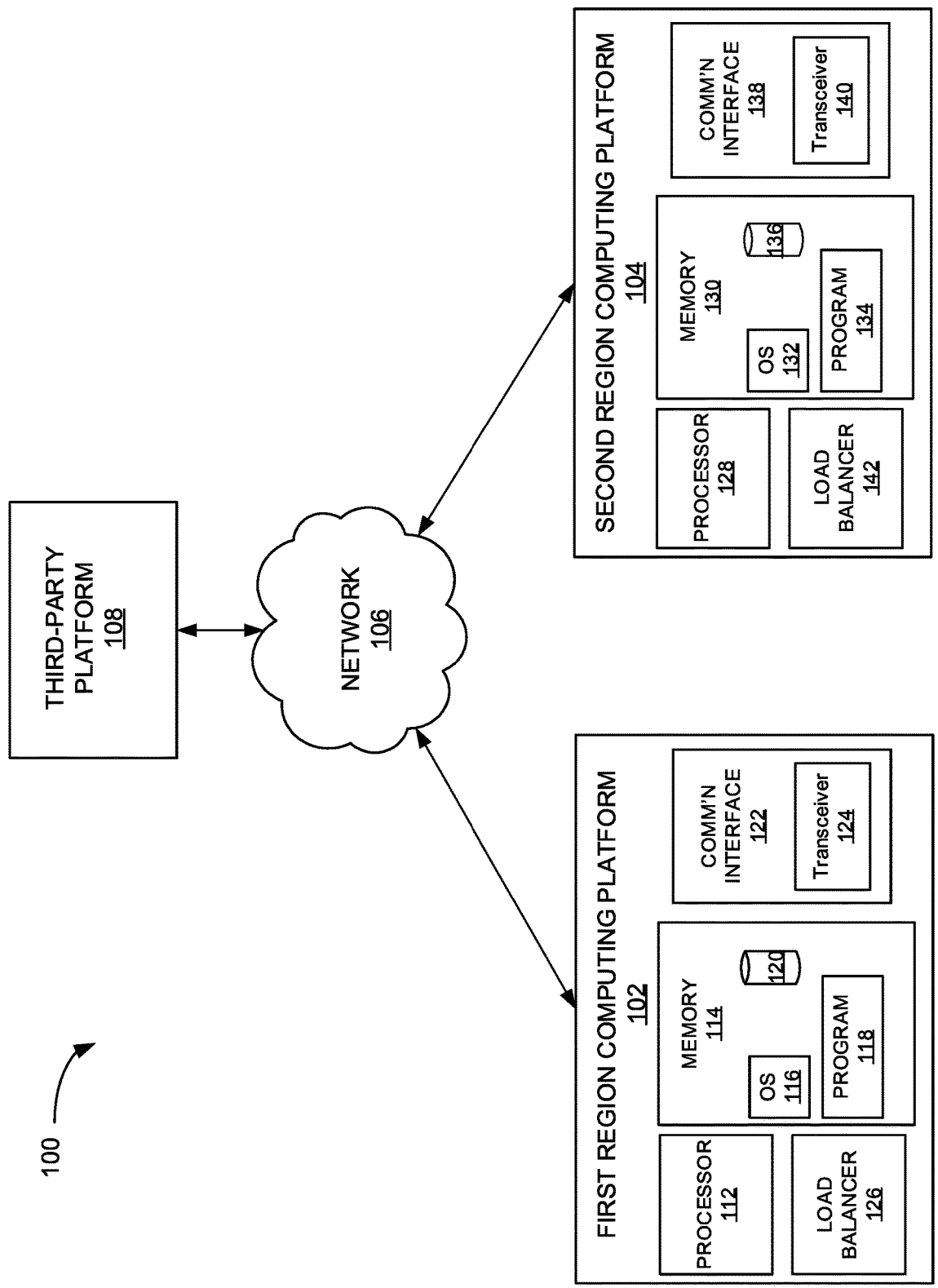
FIG. 1 is a block diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

By way of introduction, aspects discussed herein may relate to systems and methods for cross-region data processing. For example, some embodiments describe a system that may process data in either a first or second processing region depending on which region is determined to be functioning, and may either process raw data portions remaining in a raw data queue, and/or place any portions of data that cannot be processed in a raw data queue for later processing. The disclosed systems and methods provide improvements to cloud-based platforms by combining three specific techniques to ensure data processing resiliency. That is, these systems and methods combine (1) processing retries with exponential backoffs within processing function execution contexts, (2) raw data queues to extend the retries beyond the lifetime of a single function execution context, and (3) cross-region processors to provide near real-time, automated replication of application states between multiple data processing regions. This combination of features allows for seamless transitions in data processing by enabling a second region to begin processing data if and when the second region recognizes a first region is not functioning. Further, this combination of features provides for more efficient handling of internal infrastructure issues by allowing for automatic transitioning of data processing from region to region in the event a single component within one region requires maintenance. As such, the following discussion describes several exemplary systems and methods for guaranteeing automated batch file processing regardless of any processing time and/or region limitation.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a first region computing platform 102 and a second region computing platform 104 that may be in communication (either directly or via a network 106) with a third-party platform 108.

In certain embodiments, third-party platform 108 may store and/or have access to detailed customer information, such as account information. Third-party platform 108 may communicate with first region computing platform 102 and/or second region computing platform 104 to correlate compiled data, analyze the compiled data, arrange the compiled data, generate derived data based on the compiled data, and store the compiled and derived data in a database.

Network 106 may be of any suitable type, including individual connections via the internet such as cellular or WiFi™ networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

First region computing platform 102 may include a processor 112, a memory 114 containing an operating system ("OS") 116, a program 118, and a database 120, a communication interface 122 containing a transceiver 124, and a load balancer 126. Similarly, second region computing platform 104 may include a processor 128, a memory 130 containing an OS 132, a program 134, and a database 136, a communication interface 138 containing a transceiver 140, and a load balancer 142. The description of components 128, 130, 132, 134, 136, 138, 140, and 142 of second region computing platform 104 are the same as or similar to the respective descriptions of components 112, 114, 116, 118, 120, 122, 124, and 126 of first region computing platform 102, and as such, are not repeated herein for brevity. Additionally, second region computing platform 104 may be the same as or similar to first region computing platform 102 in all other respects, and as such, any reference to first region computing platform 102 should be assumed to apply to second region computing platform 104, and vice versa.

First region computing platform 102 may be a data processing platform configured to perform one or more of the processes and functionalities associated with the disclosed embodiments. In some embodiments, first region computing platform 102 may be a serverless, cloud-based data processing platform.

Processor 112 may include one or more of a microprocessor, microcontroller, digital signal processor, co-processor or the like or combinations thereof capable of executing stored instructions and operating upon stored data. Memory 114 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files, including an operating system, application programs (including, e.g., a web browser application, a widget or gadget engine, or other applications, as necessary), executable instructions, and data. In one embodiment, the processing techniques described herein are implemented as a combination of executable instructions and data within memory 114.

Processor 112 may be one or more known processing devices, such as a microprocessor from the Pentium™ family manufactured by Intel™ or the Turion™ family manufactured by AMD™. Processor 112 may constitute a single core or multiple core processor that executes parallel processes simultaneously. For example, processor 112 may be a single core processor that is configured with virtual processing technologies. In certain embodiments, processor 112 may use logical processors to simultaneously execute and control multiple processes. Processor 112 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

First region computing platform 102 may include one or more storage devices configured to store information used by processor 112 (or other components) to perform certain functions related to the disclosed embodiments. In one example, first region computing platform 102 may include memory 114 that includes instructions to enable processor 112 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, first region computing platform 102 may include memory 114 that includes instructions that, when executed by processor 112, perform one or more processes consistent with the functionalities disclosed herein. Methods, systems, and articles of manufacture consistent with disclosed embodiments are not limited to separate programs or computers configured to perform dedicated tasks. For example, first region computing platform 102 may include memory 114 that may include one or more programs 260 to perform one or more functions of the disclosed embodiments. Moreover, processor 112 may execute one or more programs located remotely from first region computing platform 102. For example, first region computing platform 102 may access one or more remote programs, that, when executed, perform functions related to disclosed embodiments.

Memory 114 may include one or more memory devices that store data and instructions used to perform one or more features of the disclosed embodiments. Memory 114 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 114 may include software components that, when executed by processor 112, perform one or more processes consistent with the disclosed embodiments. In some embodiments, memory 114 may include database 120 for storing related data to enable first region computing platform 102 to perform one or more of the processes and functionalities associated with the disclosed embodiments.

First region computing platform 102 may also be communicatively connected to one or more memory devices (e.g., databases (not shown)) locally or through a network. The remote memory devices may be configured to store information and may be accessed and/or managed by first region computing platform 102. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

First region computing platform 102 may also include communication interface 122 including transceiver 125, a mobile network interface in communication with processor 112, a bus configured to facilitate communication between the various components of first region computing platform 102, and a power source configured to power one or more components of first region computing platform 102. A communication interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a communication interface may include a serial port, a parallel port, a general-purpose input and output (GPIO) port, a game port, USB, a micro-USB port, a high definition multimedia (HDMI) port, a video port, an audio port, a Bluetooth™ port, an NFC port, another like communication interface, or any combination thereof.

In some embodiments, transceiver 124 may be configured to communicate with compatible devices and ID tags when they are within a predetermined range. Transceiver 124 may be compatible with one or more of: RFID, NFC, Bluetooth™, BLE, WiFi™, ZigBee™, ABC protocols or similar technologies.

A mobile network interface may provide access to a cellular network, the Internet, or another wide-area network. In some embodiments, a mobile network interface may include hardware, firmware, and/or software that allows processor 112 to communicate with other devices via wired or wireless networks, whether local or wide area, private or public, as known in the art. A power source may be configured to provide an appropriate alternating current (AC) or direct current (DC) to power components.

First region computing platform 102 may also include load balancer 126 configured to distribute tasks or functions across one or more components of first region computing platform 102. For example, load balancer 126 may assist in distributing portions of received data for processing such that any one component of first region computing platform 102 does not become limited, for example, in processing speed or capacity. In some embodiments, first region computing platform 102 may include, instead of or in addition to load balancer 126, a queuing mechanism configured to limit the rate of data moving from one processing function to another such that a single processing function does not become bogged down.

First region computing platform 102 may also include one or more input/output ("I/O") devices that may include one or more interfaces for receiving signals or input from devices and providing signals or output to one or more devices that allow data to be received and/or transmitted by first region computing platform 102. For example, first region computing platform 102 may include interface components, which may provide interfaces to one or more input devices, such as one or more keyboards, mouse devices, touch screens, track pads, trackballs, scroll wheels, digital cameras, microphones, sensors, and the like, that enable first region computing platform 102 to receive data from one or more users.

In example embodiments of the disclosed technology, first region computing platform 102 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While first region computing platform 102 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations may include a greater or lesser number of components than those illustrated.

FIGS. 2A-2B show a flowchart of a method 200 for cross-region data processing. Method 200 may be performed by system 100 via first region computing platform 102, second region computing platform 104, and/or third-party platform 108. Starting with FIG. 2A, in block 202, the system (e.g., system 100) may receive first data in a first processing region (e.g., first region computing platform 102). The first data may comprise any type of data in need of processing, for example, invoice data. The system may receive the first data in a file container located within a certain processing region. The container may be configured with a trigger to execute a processing function to initiate processing of the first data. The processing function may be located in the same region in which the first data was received (i.e., the "primary region"). For example, the system may receive the first data in an AWS Simple Storage Service (S3) bucket. The S3 bucket may be configured with a trigger to execute an AWS Lambda function in the same region as the S3 bucket when a new file is added to that bucket. For example, if an S3 bucket in first region computing platform 102 receives a new file, the S3 bucket may initiate processing of that new file via an AWS Lambda function located within first region computing platform 102.

In block 204, the system (e.g., system 100) may format the first data into a plurality of first data portions. That is, the system may initiate a processing function (e.g., an AWS Lambda function) to chunk the received data into smaller portions, such that the system may more easily manage and process the data, as described further below. In some embodiments, the system may receive data files each containing multiple data sets (e.g., multiple invoices), and may split each data file into single data sets (e.g., single invoices). In some embodiments, the system may convert the received data files from a comma-separated values (.csv) file format to a JavaScript Object Notation (.json) file format. In still other embodiments, the system may also be configured to perform syntactic validation of received data files such that the system may confirm the data files to be free of programming and/or stylistic errors.

In block 206, the system (e.g., system 100) may generate a copy of each first data portion. That is, when a new file is added to a file container (e.g., an S3 bucket), as described above with respect to block 202, the system may be configured to automatically generate a copy of the new file. The advantage of this feature is that each copy of each received file may be saved for future processing in an alternate region (e.g., second region computing platform 104) in the event the original region (e.g., first region computing platform 102) experiences any processing failure or downtime, as will be described further below.

In block 208, the system (e.g., system 100) may transmit each first data portion copy to a cross-region processor. That is, after the system has generated a copy of each data file, as described above, the system may be configured to automatically transmit each generated copy to a cross-region processor, i.e., a processor that may communicate and interact with multiple processing regions (e.g., first region computing platform 102 and second region computing platform 104). In the event one region (e.g., first region computing platform 102) experiences any processing failure or downtime, the cross-region processor may be configured to transmit each generated copy of each data file to another region (e.g., second region computing platform 104) to take over the processing of the data files.

In block 210, the system (e.g., system 100) may determine whether the first processing region (e.g., first region computing platform 102) is functioning. As described above with respect to block 202, the system may be configured to begin processing new data in its respective primary region. If attempts to process the data in the primary region fail, the system may wait a predefined period of time before again attempting to process the data in the primary region. The assumption in this type of system set up is that most failures of dependent processing services tend to be merely temporary failures. If, however, after waiting the predefined period of time, the system's attempts to begin processing the data continue to fail, the system may be configured to cease attempting to begin processing the data, and to instead allow for processing of the data in an alternate processing region (e.g., second region computing platform 104). As described above with respect to block 208, each first data portion copy will have already been transmitted to the cross-region processor. Once the alternate processing region has waited its own predefined period of time to recognize the primary region's attempts to process the data have been unsuccessful, the alternate processing region, ignoring the data that the primary region has already attempted to process, may automatically take over by retrieving each first data portion copy from the cross-region processor and making its own attempts to process the data. This feature provides the added benefit of enabling guaranteed, real-time processing across multiple regions in the event of a service failure in a given region.

In block 212, in response to determining the first processing region is functioning, the system (e.g., system 100) may process the one or more first data portions of the plurality of first data portions. Processing of the one or more first data portions (e.g., via an AWS Lambda function) may include reading the data portions, re-formatting the data portions, and/or submitting the data portions to a centralized location (e.g., third-party platform 108). When submitting the data portions to the centralized location, the system may be configured to wait for a response from the centralized location, the response indicating whether the submitted data portions were indeed found valid for purposes of further processing that may be performed within the centralized location.

In block 214, the system (e.g., system 100) may determine that a first raw data queue comprises one or more second portions of raw data. That is, the system may be configured to access a first raw data queue that comprises any portions of data that the system previously attempted, yet failed, to completely process. For example, the system may have previously begun processing a portion of data by initiating a processing function (e.g., an AWS Lambda function). The processing function may have been configured to run for only a predetermined period of time, i.e. its execution context (e.g., fifteen minutes), after which time the processing function may have stopped running. Once the processing function stopped running, any data that was only partially processed, may then have been transmitted to the raw data queue such that a new processing function might complete processing of that data at a later time. This feature provides the added benefit of ensuring a processing function's execution context will not lead to permanently losing any information contained in the unprocessed data portions.

In block 216, the system (e.g., system 100) may process the one or more second portions of raw data. Processing the portions of raw data may involve initiating another processing function (e.g., an AWS Lambda function), the specific function being dependent on the type and size of the raw data. Processing the portions of raw data may be functionally equivalent to processing of the one or more first data portions, as described above with respect to block 212, with the exception of a unique time stamp associated with when each raw data portion and first data portion is processed.

In block 218, the system (e.g., system 100) may transmit, to a centralized location (e.g., third-party platform 108), the one or more processed first data portions and the one or more processed second portions of raw data. The centralized location may be owned and/or operated by a third-party, e.g., an entity or organization. The centralized location may initiate one or more separate processing functions (e.g., AWS Lambda functions) to continue working with the processed data. For example, the centralized location may initiate one or more processing functions to validate, batch, parse, and/or store the processed data. In some embodiments, the system may also be configured to connect to the centralized location by creating an authentication session such that the system may transmit the one or more processed first data portions and the one or more processed second portions of raw data to the centralized location along an authenticated channel.

Turning to FIG. 2B, in block 220, in response to determining the first processing region is not functioning, the system (e.g., system 100) may transmit, from the cross-region processor, each first data portion copy to a second processing region (e.g., second region computing platform 104). The second processing region may be configured to be the same as or similar to the first processing region.

In block 222, the system (e.g., system 100) may process the one or more first data portion copies. Processing of the data in the second processing region may be the same as or similar to processing of the data in the first processing region, as described above with respect to block 212.

In block 224, the system (e.g., system 100) may determine that a second raw data queue comprises one or more third portions of raw data. This step may be the same as or similar to the respective determination step performed in the first processing region and including the first raw data queue, as described above with respect to block 214.

In block 226, the system (e.g., system 100) may process the one or more third portions of raw data. This step may be the same as or similar to the respective processing step in the first processing region, as described above with respect to block 216.

In block 228, the system (e.g., system 100) may transmit, to the centralized location (e.g., third-party platform 108), the one or more processed first data portion copies and the one or more processed third portions of raw data. This step may be the same as or similar to the respective transmitting step in the first processing region, as described above with respect to block 218.

FIGS. 3A-3B show a flowchart of a method 300 for cross-region data processing. Method 300 may also be performed by first region computing platform 102, second region computing platform 104, and/or third-party platform 108. Method 300 is similar to method 200 of FIGS. 2A-2B except that method 300 also includes blocks 312, 316, 318, 322, 326, and 328. The descriptions of blocks 302, 304, 306, 308, 310, 314, 320, and 324 of method 300 are the same as or similar to the respective descriptions of blocks 202, 204, 206, 208, 210, 212, 220, and 222 of method 200, and as such, are not repeated herein for brevity.

Starting with FIG. 3A, in block 312, the system (e.g., system 100) may determine whether one or more first data portions of the plurality of first data portions can be processed. As described above with respect to blocks 202 and 210, the system may be configured to begin processing the one or more first data portions in their respective primary region, i.e., the region in which the data portions were first received (e.g., first region computing platform 102). Within the primary region, the system may initiate a processing function (e.g., an AWS Lambda function) to attempt to process each of the one or more first data portions by running that specific processing function's execution context. For each data portion of the one or more first data portions, the system may determine that the processing function's execution context is either able to fully process the data portion, or times out after that execution context's predefined time limit (e.g., fifteen minutes), thus being unable to complete processing of the data portion.

In block 316, in response to determining the one or more first data portions can be processed, the system (e.g., system 100) may transmit, to a centralized location (e.g., third-party platform 108), the one or more processed first data portions. This step may be the same as or similar to block 218 of FIG. 2A, except that block 316 may only include transmitting of the one or more processed first data portions.

In block 318, in response to determining the one or more first data portions cannot be processed, the system (e.g., system 100) may transmit the one or more first data portions that cannot be processed to a first raw data queue. The first raw data queue of block 318 may be the same as or similar to the first raw data queue as described with respect to block 214 of FIG. 2A. While block 318 includes transmitting data portions that cannot be processed to the first raw data queue for later processing, in some embodiments, the system may also retrieve raw data portions from the first raw data queue to attempt to reprocess those raw data portions, as described with respect to block 216 of FIG. 2A.

Turning to FIG. 3B, in block 322, the system (e.g., system 100) may determine whether one or more first data portion copies can be processed. Determining whether one or more first data portion copies can be processed may be the same as or similar to determining whether one or more first data portions can be processed, as described above with respect to block 312.

In block 326, in response to determining the one or more first data portion copies can be processed, the system (e.g., system 100) may transmit, to the centralized location (e.g., third-party platform 108), the one or more processed first data portion copies. This step may be the same as or similar to block 316 as described above.

In block 328, in response to determining the one or more first data portion copies cannot be processed, the system (e.g., system 100) may transmit the one or more first data portion copies that cannot be processed to a second raw data queue. This step may be the same as or similar to block 318, with the second raw data queue being the same as or similar to the first raw data queue.

FIG. 4 shows a flowchart of a method 400 for cross-region data processing. Method 400 may also be performed by first region computing platform 102, second region computing platform 104, and/or third-party platform 108. Method 400 is similar to method 200 of FIGS. 2A-2B except that method 400 also includes blocks 410 and 416. The descriptions of blocks 402, 404, 406, 408, 412, and 414 of method 400 are the same as or similar to the respective descriptions of blocks 202, 204, 206, 208, 210, and 220 of method 200, and as such, are not repeated herein for brevity.

In block 410, the system (e.g., system 100) may attempt to process each first data portion. This step may be the same as or similar to step 312 of FIG. 3A. That is, the system may initiate a processing function (e.g., an AWS Lambda function) to attempt to process each of the first data portions within a processing function execution context. As described above, that processing function execution context may or may not run long enough to be able to fully process each first data portion.

In block 416, in response to determining the first processing region is functioning, the system (e.g., system 100) may continue processing of the plurality of first data portions in the first processing region. Continuing to process the plurality of data portions in the first processing region may include steps 212, 214, 216, and/or 218 of FIG. 2A and/or steps 312, 314, 316, and/or 318 of FIG. 3A.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to customer devices that may include mobile computing devices. Those skilled in the art will recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASES

The following example use cases describe examples of a typical user flow pattern. They are intended solely for explanatory purposes and not in limitation.

In one example, an organization may utilize an AWS computing process for processing of organization-related invoice files. The files may first be delivered to an AWS S3 bucket in an east coast data processing region. The S3 bucket may, upon receiving the files, automatically trigger the execution of a first AWS Lambda function within the east coast data processing region. This first Lambda function may have an execution context of fifteen minutes and may be configured to format the data files into smaller chunks of data. At the same time, the first Lambda function may also generate a copy of each data file. The system may be configured to transmit each copy of each data file to a central cross-region processor that can communicate and interact with both the east coast data processing region and a west coast data processing region. The east and west coast data processing regions may be identical in how they are configured and how they process data such that they each may act as a backup processing region for the other in the event either processing region experiences a temporary failure. The system may determine the east coast data processing region is functioning properly, i.e., is not experiencing any temporary system or processing failure, and as such, may process the received data files in only the east coast processing region. The east coast processing region may include a processor that helps to slowly pass the smaller chunks of data from the first Lambda function to a second Lambda function, such that the second Lambda function does not become bogged down. The second Lambda function may be configured with a fifteen-minute execution context, during which time the second Lambda function may attempt to process each smaller chunk of data. With each chunk of data, if the second Lambda function is able to complete processing within its fifteen-minute execution context, the second Lambda function may then transmit that chunk of data to a central location, such as a backend processing platform owned and operated by the organization itself. If, however, the second Lambda function's execution context expires before it has fully processed one or more chunks of data, the second Lambda function may first make another attempt to process the data chunks, and if again unsuccessful, may send those specific chunks of unprocessed or "raw" data chunks to a raw data queue such that any information contained within those data chunks will not be lost. The second Lambda function may also check the raw data queue to determine whether any raw data chunks remain from a previous Lambda function's processing attempt, and if so, may also attempt to reprocess those raw data chunks. If the second Lambda function is successful at fully processing any raw data chunks remaining in the raw data queue, the second Lambda function may also transit those chunks of data to the central location.

In another example, an organization may utilize an AWS computing process for processing of organization-related invoice files. The files may first be delivered to an AWS S3 bucket in an east coast data processing region, as in the example above. The S3 bucket may, upon receiving the files, automatically trigger the execution of a first AWS Lambda function within the east coast data processing region. This first Lambda function may have an execution context of fifteen minutes and may be configured to format the data files into smaller chunks of data. At the same time, the first Lambda function may also generate a copy of each data file. The system may be configured to transmit each copy of each data file to a central cross-region processor that can communicate and interact with both the east coast data processing region and a west coast data processing region. The east and west coast data processing regions may be identical in how they are configured and how they process data such that they each may act as a backup processing region for the other in the event either processing region experiences a temporary failure. The system may determine the east coast data processing region is not functioning properly, i.e., is experiencing a temporary system or processing failure, and as such, the west coast data processing region may automatically retrieve each data file copy from the central cross-region processor. The west coast data processing region may then process the data file copies in the same way as the east coast processing region processed the data files in the above example.

What is claimed is:
1. A system for data processing, comprising:
one or more processors; and
a memory in communication with the one or more processors and storing instructions that, when executed by the one or more processors, are configured to cause the system to:
receive first data in a first processing region;
format the first data into a plurality of first data portions;
generate a copy of each first data portion of the plurality of first data portions;
transmit each first data portion copy to a cross-region processor;
determine whether the first processing region is functioning;
responsive to determining the first processing region is functioning:
determine whether one or more first data portions of the plurality of first data portions can be processed;
responsive to determining the one or more first data portions of the plurality of first data portions can be processed, process the one or more first data portions of the plurality of first data portions;
responsive to determining the one or more first data portions of the plurality of first data portions cannot be processed, transmit the one or more first data portions that cannot be processed to a first raw data queue;
determine that the first raw data queue comprises one or more second portions of raw data;
process the one or more second portions of raw data; and
transmit, to a centralized location, the one or more processed first data portions and the one or more processed second portions of raw data; and
responsive to determining the first processing region is not functioning:
transmit, from the cross-region processor, each first data portion copy to a second processing region;
determine whether one or more first data portion copies of the plurality of first data portion copies can be processed;
responsive to determining the one or more first data portion copies of the plurality of first data portion copies can be processed, process the one or more of the first data portion copies;
responsive to determining the one or more first data portion copies of the plurality of first data portion copies cannot be processed, transmit the one or more first data portion copies that cannot be processed to a second raw data queue;
determine that the second raw data queue comprises one or more third portions of raw data;
process the one or more third portions of raw data; and
transmit, to the centralized location, the one or more processed first data portion copies and the one or more processed third portions of raw data.

2. The system of claim 1, wherein the first data comprises invoice data.

3. The system of claim 1, wherein the system utilizes one or more functions each comprising a time limit.

4. The system of claim 3, wherein at least one of the one or more processors is configured to extend a time limit of at least one of the one or more functions.

5. The system of claim 3, wherein at least one of the one or more functions comprises a time limit of 15 minutes.

6. The system of claim 1, wherein the instructions are further configured to cause the system to:
responsive to determining the first processing region is not functioning, receive second data in the second processing region.

7. A system for data processing, comprising:
one or more processors; and
a memory in communication with the one or more processors and storing instructions that, when executed by the one or more processors, are configured to cause the system to:
receive first data in a first processing region;
format the first data into a plurality of first data portions;
generate a copy of each first data portion of the plurality of first data portions;
transmit each first data portion copy to a cross-region processor;
determine whether the first processing region is functioning;
responsive to determining the first processing region is functioning:
determine whether one or more first data portions of the plurality of first data portions can be processed;
responsive to determining the one or more first data portions can be processed, process the one or more first data portions of the plurality of first data portions;
transmit, to a centralized location, the one or more processed first data portions; and
responsive to determining the one or more first data portions of the plurality of first data portions cannot be processed, transmit the one or more first data portions that cannot be processed to a first raw data queue; and
responsive to determining the first processing region is not functioning:
transmit, from the cross-region processor, each first data portion copy to a second processing region;
determine whether one or more first data portion copies can be processed;
responsive to determining the one or more first data portions copies can be processed:
process the one or more first data portion copies;
transmit, to the centralized location, the one or more processed first data portion copies; and
responsive to determining the one or more first data portions copies cannot be processed, transmit the one or more first data portions copies that cannot be processed to a second raw data queue.

8. The system of claim 7, wherein the first data comprises invoice data.

9. The system of claim 7, wherein the system utilizes one or more functions each comprising a time limit.

10. The system of claim 7, wherein the instructions are further configured to cause the system to:
responsive to determining the first processing region is not functioning, receive second data in the second processing region.

11. The system of claim 7, wherein the instructions are further configured to cause the system to:
responsive to determining the first processing region is functioning:
determine whether the first raw data queue comprises one or more second portions of raw data;
responsive to determining the first raw data queue comprises one or more second portions of raw data, process at least one of the one or more second portions of raw data; and
transmit, to the centralized location, the at least one processed second portion of raw data.

12. The system of claim 7, wherein the instructions are further configured to cause the system to:
responsive to determining the first processing region is not functioning:
determine whether the second raw data queue comprises one or more third portions of raw data;
responsive to determining the second raw data queue comprises one or more third portions of raw data, process at least one of the one or more third portions of raw data; and
transmit, to the centralized location, the at least one processed third portion of raw data.

13. A system for data processing, comprising:
one or more processors; and
a memory in communication with the one or more processors and storing instructions that, when executed by the one or more processors, are configured to cause the system to:
receive first data in a first processing region;
format the first data into a plurality of first data portions;
generate a copy of each first data portion of the plurality of first data portions;
transmit each first data portion copy to a cross-region processor;
attempt to process each first data portion of the plurality of first data portions;
determine the first processing region is not functioning; and
responsive to determining the first processing region is not functioning:
transmit, from the cross-region processor, each first data portion copy to a second processing region;
determine whether at least one copy of the one or more first data portion copies cannot be processed; and
responsive to determining the at least one copy cannot be processed, transmit the at least one copy that cannot be processed to a first raw data queue.

14. The system of claim 13, wherein the instructions are further configured to cause the system to:
process one or more first data portions of the plurality of first data portions;
access a first raw data queue;
determine whether the first raw data queue comprises one or more second portions of raw data;
responsive to determining the first raw data queue comprises one or more second portions of raw data, process at least one of the one or more second portions of raw data; and
transmit, to a centralized location, the one or more processed first data portion copies and the at least one processed second portion of raw data.

15. The system of claim 13, wherein the system utilizes one or more functions each comprising a time limit.

16. The system of claim 15, wherein at least one of the one or more processors is configured to extend a time limit of at least one of the one or more functions.

17. The system of claim 13, wherein the instructions are further configured to cause the system to:
receive second data in the second processing region.

* * * * *